United States Patent
Pandit et al.

(10) Patent No.: US 7,757,282 B2
(45) Date of Patent: Jul. 13, 2010

(54) SYSTEM AND METHOD FOR DISTINGUISHING SAFE AND POTENTIALLY UNSAFE DATA DURING RUNTIME PROCESSING

(75) Inventors: Bhalchandra S. Pandit, Redmond, WA (US); James W. Truher, III, Bellevue, WA (US); Jeffrey P. Snover, Woodinville, WA (US); Bruce G. Payette, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1182 days.

(21) Appl. No.: 11/133,676

(22) Filed: May 20, 2005

(65) Prior Publication Data

US 2006/0277604 A1   Dec. 7, 2006

(51) Int. Cl.
G06F 11/00 (2006.01)
G06F 12/14 (2006.01)
G06F 12/16 (2006.01)
G08B 23/00 (2006.01)

(52) U.S. Cl. ..................................................... 726/22

(58) Field of Classification Search .................. 726/22, 726/23, 24, 25
See application file for complete search history.

(56) References Cited

U.S. PATENT DOCUMENTS

| | | | |
|---|---|---|---|
| 6,918,038 B1 * | 7/2005 | Smith et al. ..................... 726/22 |
| 7,136,906 B2 * | 11/2006 | Giacalone, Jr. .............. 709/218 |
| 7,207,065 B2 * | 4/2007 | Chess et al. .................... 726/25 |
| 7,269,759 B2 * | 9/2007 | Biles ............................ 714/42 |
| 7,385,938 B1 * | 6/2008 | Beckett et al. ............... 370/254 |
| 7,426,748 B2 * | 9/2008 | Imai ............................ 726/11 |
| 7,490,268 B2 * | 2/2009 | Keromytis et al. ............ 714/38 |
| 2003/0187973 A1 * | 10/2003 | Wesley ......................... 709/224 |
| 2003/0188019 A1 * | 10/2003 | Wesley ......................... 709/245 |
| 2003/0217352 A1 * | 11/2003 | Ueno et al. .................. 717/115 |
| 2005/0071722 A1 * | 3/2005 | Biles ........................... 714/746 |
| 2005/0273854 A1 * | 12/2005 | Chess et al. ................... 726/22 |
| 2005/0273859 A1 * | 12/2005 | Chess et al. ................... 726/25 |
| 2005/0273860 A1 * | 12/2005 | Chess et al. ................... 726/25 |
| 2005/0273861 A1 * | 12/2005 | Chess et al. ................... 726/25 |
| 2006/0156397 A1 * | 7/2006 | Dai .............................. 726/22 |
| 2006/0259895 A1 * | 11/2006 | Thibadeau ................... 717/115 |
| 2007/0074188 A1 * | 3/2007 | Huang et al. ................. 717/141 |

(Continued)

OTHER PUBLICATIONS

Huang et al., Securing Web Application Code by Static Analysis and Runtime Protection, May 17, 2004, ACM.*

(Continued)

Primary Examiner—David García Cervetti
(74) Attorney, Agent, or Firm—Lee & Hayes, PLLC

(57) ABSTRACT

The techniques and mechanisms described herein are directed to a taint mechanism. An object-based command declares a taint directive for a parameter within a command declaration. The taint directive is then associated with that parameter in a manner such that when an engine processes the command, the engine determines whether to process the command based on the taint directive and input for the parameter. The taint directive may specify that the input may be tainted or untainted. The command declaration may also include a taint parameter that specifies a taint characteristic for output from the command. The taint characteristic may be tainted, untainted, or propagated. Any type of object may become tainted. An untaint process may be applied to tainted data to obtain untainted data if an authorization check performed by the engine is successful.

20 Claims, 6 Drawing Sheets

U.S. PATENT DOCUMENTS

2007/0240138 A1* 10/2007 Chess et al. .................. 717/143
2007/0271617 A1* 11/2007 Mitomo et al. ................ 726/25
2007/0282651 A1* 12/2007 Naik et al. ..................... 705/8
2008/0216175 A1* 9/2008 Pike ............................ 726/22
2008/0301766 A1* 12/2008 Makino et al. ................ 726/1
2009/0037672 A1* 2/2009 Colbert et al. .............. 711/154
2009/0158430 A1* 6/2009 Borders ....................... 726/23

OTHER PUBLICATIONS

Nguyen-Tuong et al., Automatically hardening web applications using precise tainting, 2004, DARPA.*

Dynamic Taint Analysis for Automatic Detection, Analysis, and SignatureGeneration of Exploits on Commodity Software—James Newsome, Carnegie Mellon University; Dawn Song, Carnegie Mellon University, Feb. 2005.*

* cited by examiner

SYSTEM AND METHOD FOR DISTINGUISHING SAFE AND POTENTIALLY UNSAFE DATA DURING RUNTIME PROCESSING

TECHNICAL FIELD

This document generally relates to security mechanisms, and more particularly, to run-time security mechanisms while processing scripts.

BACKGROUND

System administrators use scripts to automate tasks. Many of these scripts accept input from an outside source. If this occurs, the input should be validated before the script uses the input during further processing of the script. However, it is nearly impossible to force this type of validation. In addition, malicious individuals are continually seeking new ways to exploit overlooked vulnerabilities within scripts. Some of the now known vulnerabilities include overrunning buffers, inserting unexpected text/code in the input, inserting unexpected code for execution, and the like.

The Perl language developed a security feature that is directed at minimizing risks associated with input data collected from web forms. This security feature is commonly referred to as "taint". The taint feature is enabled through a switch on the command line. When the taint feature is enabled, user input, file input, and environment variables are specifically marked as tainted (i.e., potentially unsafe). In addition, any attempt to use tainted data to affect the outside world is blocked and causes the program to abort. In order to untaint a tainted variable, the tainted variable is run through a regular expression. The regular expression is set to match any possible legal values that the string might have.

While Perl's taint option helps create more secure programs in specific situations, a more pervasive and more comprehensive taint mechanism is needed that handles various scripting situations.

SUMMARY

The techniques and mechanisms described herein are directed at distinguishing safe and potentially unsafe data during runtime processing of scripts. The taint mechanism operates on any type of object and allows programmers to specify which commands output tainted data and which input parameters only accept untainted data. Once data is tainted, the taint property is propagated to data derived from the tainted data. An untaint process may be applied to untaint tainted data. The ability to untaint data is allowed under certain restrictions, such as having the required rights and/or privileges.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Briefly, the present taint mechanism distinguishes between safe and potentially unsafe data during runtime processing. In the following description, the term "taint" is used to refer to potentially unsafe data and the term "untainted" is used to refer to safe data. Programmers that develop commands may specify whether or not their commands accept tainted data and whether their commands propagate tainted data. Any type of object (i.e., data) may become tainted. Once data becomes tainted, the taint property is propagated to data derived from the tainted data. The tainted data may be untainted by processing it through a validation process. The present taint mechanism determines whether to allow the untainting process based on a set of privileges assigned to the code module requesting the untaint operation. By using the present taint mechanism, an engine automatically performs tainting on any type of data. In addition, the engine provides the additional security check of determining whether untainting is authorized. These and other advantages will become clear after reading the following detailed description.

Exemplary Computing Environment

Figure 1:
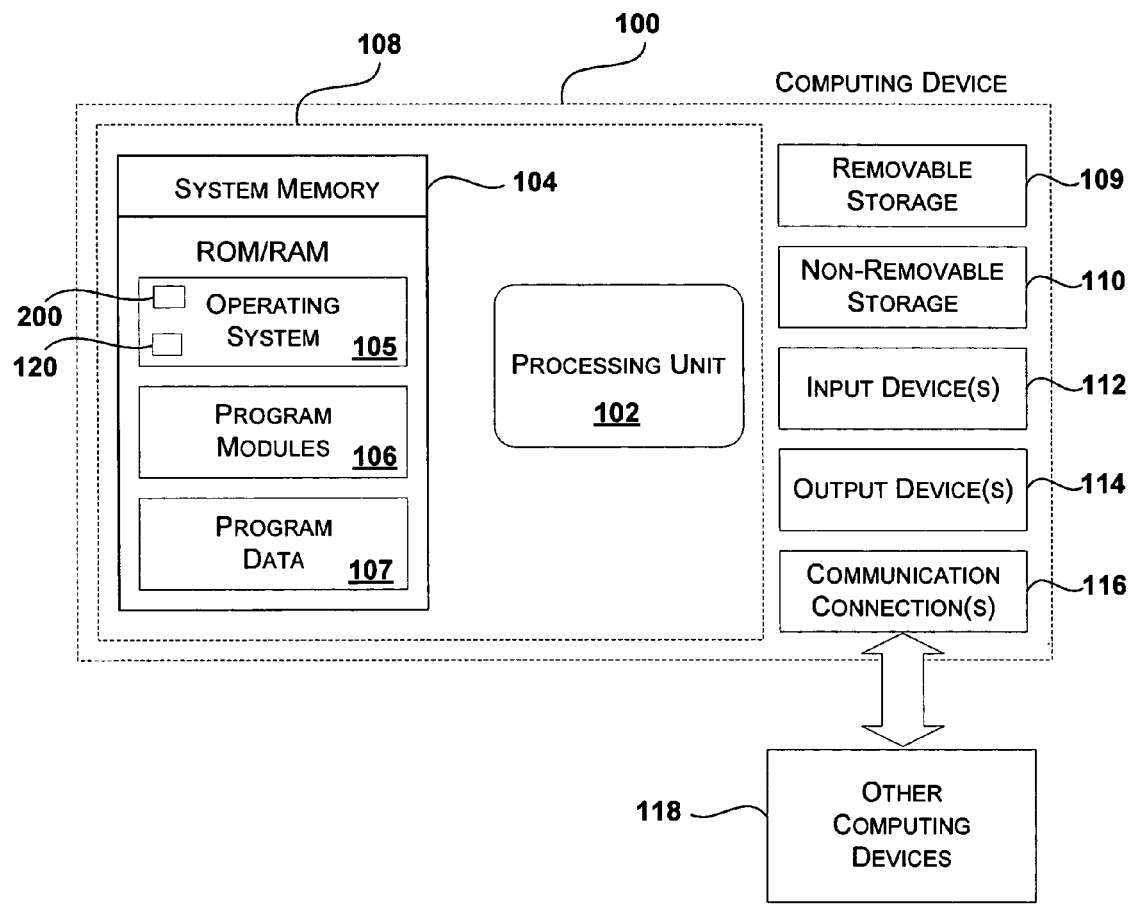
FIG. 1 is an illustrative computer environment that may be used to implement the taint mechanism described herein.

The various embodiments of the present taint mechanism may be implemented in different computer environments. The computer environment shown in FIG. 1 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 1, one exemplary system for implementing the taint mechanism includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. The operating system 105 includes a component-based framework 120 that supports components (including properties and events), objects, inheritance, polymorphism, reflection, and provides an object-oriented component-based application programming interface (API), such as the .NET™ Framework manufactured by Microsoft Corporation, Redmond, Wash. The operating system 105 also includes an administrative tool framework 200 that interacts with the component-based framework 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer-readable instructions, data structures, program modules, or other data. System memory 104, removable storage 109 and non-removable storage 110 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connection(s) 116 is one example of communication media. Communication media may typically be embodied by computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

Figure 2:
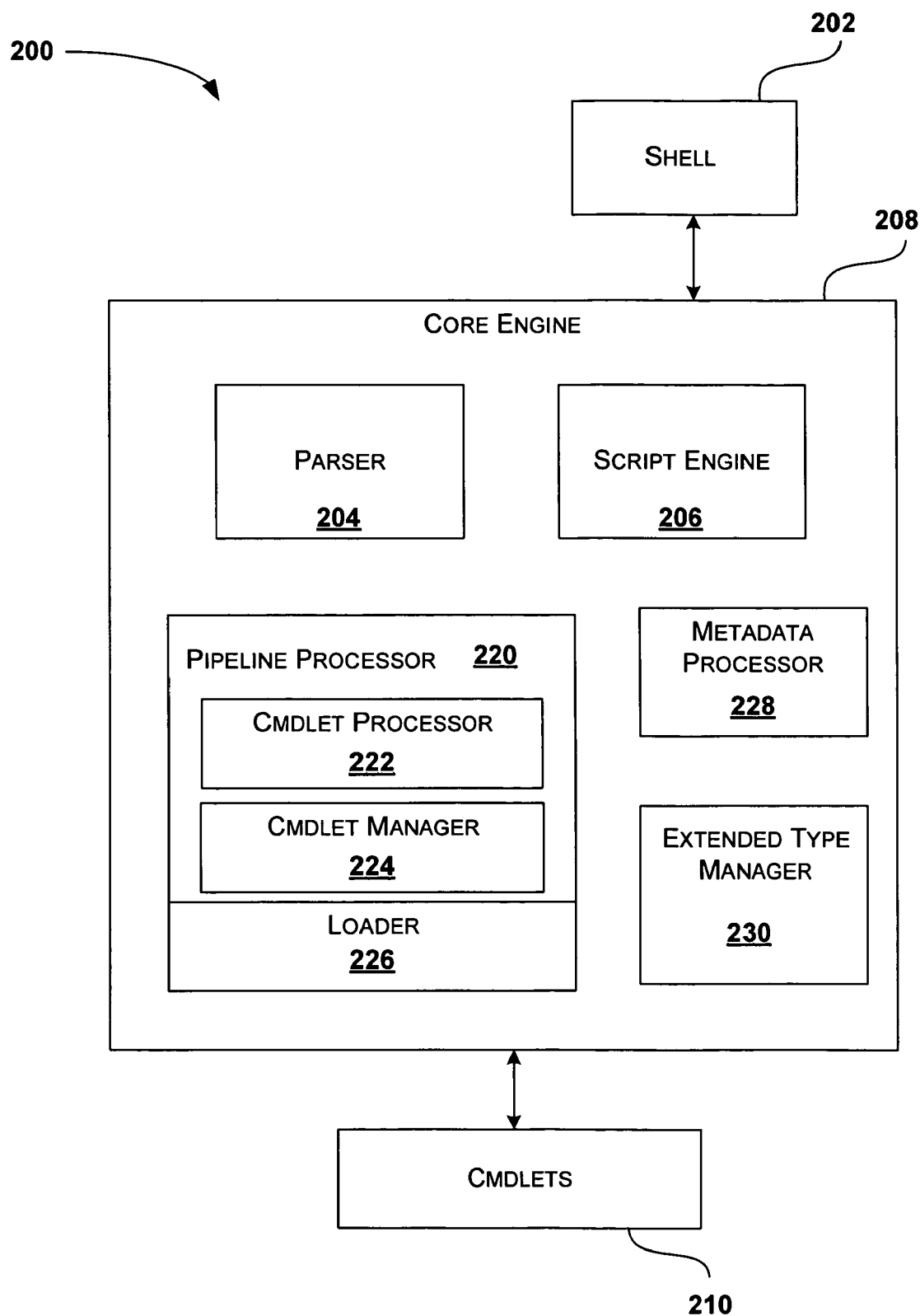
FIG. 2 is a functional block diagram illustrating computer-readable components for implementing the taint mechanism that distinguishes safe and potentially unsafe data.

FIG. 2 is a functional block diagram illustrating salient components of one environment (i.e., an exemplary administrative tool framework 200) in which the present taint mechanism may be implemented. After reading the following description, those skilled in the art will appreciate that the present taint mechanism may also be implemented within other interpretive environments.

The salient components of the exemplary administrative tool framework include a shell 202, a core engine 208, and cmdlets 210. Each of these components may be one or more software modules implemented within the operating system 105 illustrated in FIG. 2, or as one or more program modules 106 illustrated in FIG. 2, or some combination of the two.

Cmdlets 210 represent any available command to the administrative tool framework. The available commands may by management commands that query or manipulate configuration information associated with the computing device, non-management commands that group, sort, filter, and perform other processing on input/output information, or the like. Cmdlets correspond to commands in traditional administrative environments. However, cmdlets are quite different than these traditional commands. For example, cmdlets are typically smaller in size than their counterpart commands because the cmdlets can utilize common functions provided by the administrative tool framework, such as parsing, data validation, error reporting, and the like. Because such common functions can be implemented once and tested once, the use of cmdlets throughout the administrative tool framework allows the incremental development and test costs associated with application-specific functions to be quite low compared to traditional environments. Cmdlets may run in the same processes within the administrative tool framework. This allows cmdlets to exchange "live" objects between each other. This ability to exchange "live" objects allows the cmdlets to directly invoke methods on these objects.

Shell 202 is a host program that exposes automation features to users via a command line and/or scripting language. The shell uses a set of interfaces made available by a host to embed the administrative tool environment. The shell manages interactions between a user and other components within the administrative tool framework.

The core engine 224 includes a parser 204, a script engine 206, and a metadata processor 228. In addition, the core engine may include a pipeline processor 220, a loader 226, and an extended type manager 230. The parser 204 provides mechanisms for receiving input requests from various host programs (e.g., shell 202) and mapping the input requests to uniform cmdlet objects that are used throughout the administrative tool framework. In addition, the parser 204 may perform data processing based on the input received.

The script engine 206 provides mechanisms and services to tie multiple cmdlets together using a script. A script is an aggregation of command lines that share session state under strict rules of inheritance. The multiple command lines within the script may be executed either synchronously or asynchronously, based on the syntax provided in the input request. The script engine 206 has the ability to process control structures, such as loops and conditional clauses and to process variables within the script. The script engine also manages session state and gives cmdlets access to session data based on a policy (not shown).

The loader 226 is configured to load each cmdlet in memory in order for the pipeline processor 220 to execute the cmdlet. The pipeline processor 220 includes a cmdlet processor 222 and a cmdlet manager 224. The cmdlet processor 222 dispatches individual cmdlets. If the cmdlet requires execution on a remote, or a set of remote machines, the cmdlet processor 222 coordinates the execution with a remoting cmdlet. The cmdlet manager 224 handles the execution of aggregations of cmdlets. The cmdlet manager 224, the cmdlet processor 222, and the script engine 206 communicate with each other in order to perform the processing on the input received from the host program (e.g., shell 202). The communication may be recursive in nature. For example, if the shell provides a script, the script may invoke the cmdlet manager 224 to execute a cmdlet, which itself may be a script. The script may then be executed by the script engine 206.

The metadata processor 228 is configured to access and store metadata within a metadata store (not shown). The metadata may be supplied via the command line, within a cmdlet class definition, and the like. Different components within the administrative tool framework 200 may request the metadata when performing their processing. For example, parser 204 may request metadata to validate parameters supplied on the command line.

The extended type manager 230 is configured to access precisely parse-able input (not shown) and to correlate the precisely parse-able input with a requested data type. For the following discussion, precisely parse-able input is defined as input in which properties and values may be discerned. Some exemplary precisely parse-able input include Windows Management Instrumentation (WMI) input, ActiveX Data Objects (ADO) input, eXtensible Markup Language (XML) input, and object input, such as NET objects. Other precisely parse-able input may include third party data formats. The extended type manager 230 creates "objects" from any type of precisely parse-able input. The extended type manager 230 then provides the requested information to the requesting component, such as the pipeline processor 220 or parser 204.

The present taint mechanism is implemented by using special declarative attributes when defining cmdlets 210 and/or specifying casting constructs within scripts (not shown). The special attributes are interpreted by the metadata processor 228 and affect the processing of the cmdlet in the pipeline processor 220. Any type of object when processed by the pipeline processor may be marked as untainted (i.e., trusted) or as tainted (i.e., not trusted). Because the parser 204 maps input requests to uniform cmdlet objects and performs parameter binding, the core engine 208 can enforce taint tracking for all processing, not just system calls as is done in the Perl language. In addition, the present taint mechanism provides the ability to specifically identity the input parameters that can not receive tainted data and the input parameters that can receive tainted data. This provides a fine degree of granularity when applying the taint feature. In contrast, the Perl language requires a switch on the command line. When the switch is supplied, data passed to pre-defined system calls is checked for tainted data. Because the switch affects all the lines that are processed, the Perl language implementation does not allow the programmer any further degree of control over the tainting process.

Figure 3:
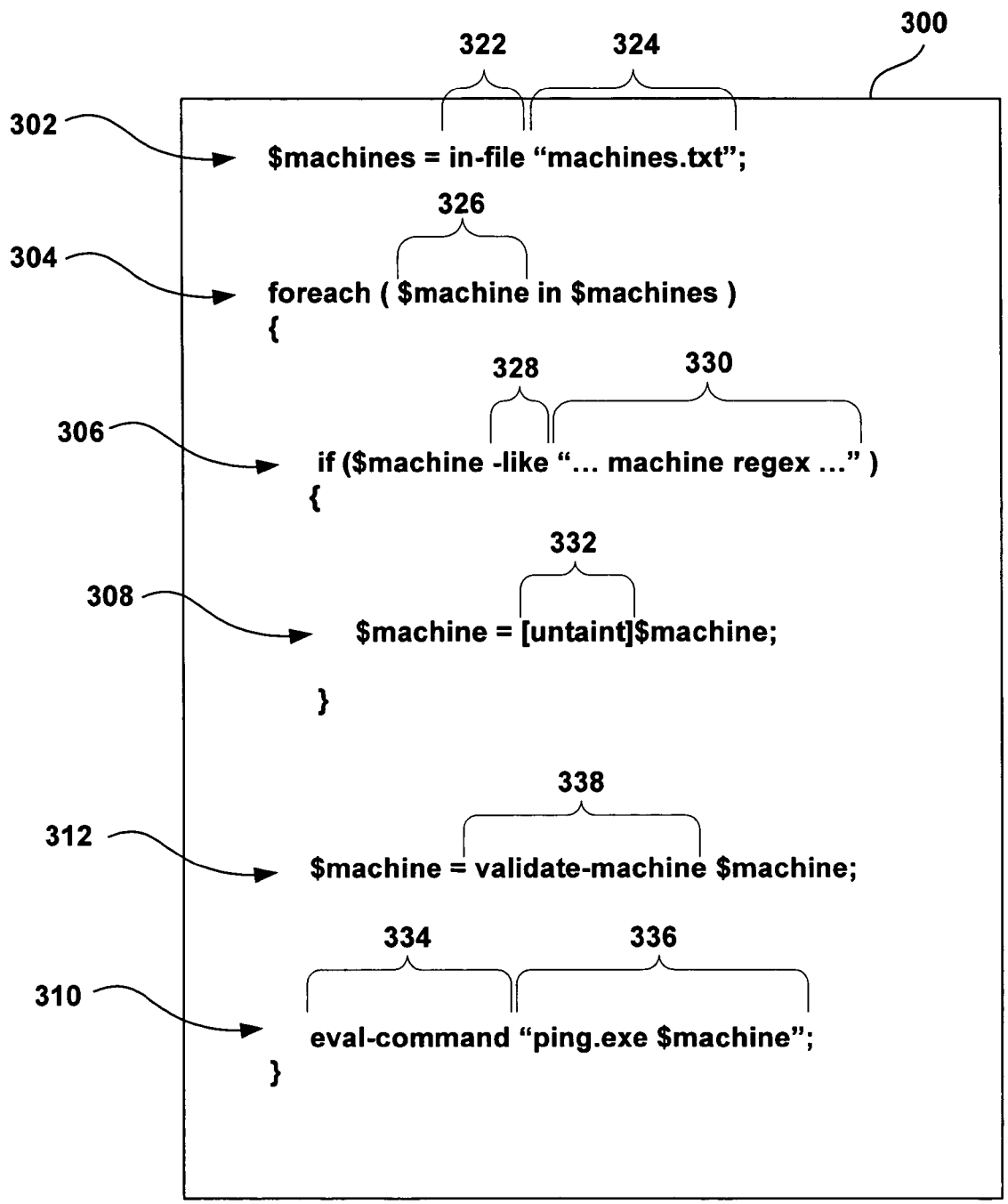
FIG. 3 illustrates portions of an example script that is used to describe exemplary implementations of the present taint mechanism.

FIG. 3 illustrates portions of an example script 300. Script 300 will now be used to describe exemplary implementations of the present taint mechanism. Script 300 may be used by a system administrator for checking the status of a number of machines periodically. The machines that are periodically checked are listed in a file. This allows the system administrator to easily add new machines and/or delete machines that are no longer in use. Unfortunately, the file can also be edited by a malicious individual to cause harm to one or more computers. As will be described below, by using the present taint mechanism, if harmful code is input into the file, the script will not execute the harmful code.

Script 300, line 302, illustrates a cmdlet 322 (e.g., "in-file" cmdlet) that reads a file (e.g., "machine.txt") specified on the command line as a parameter (e.g., file parameter 324). Cmdlet 322 returns an array of strings that are stored in $machines. Each entry in the array corresponds to a line in the file. For the above example, each entry should specify a machine name. As will be described below, cmdlet 322 is configured to output tainted data. Therefore, the output of cmdlet 322 (i.e., $machines) is marked as tainted.

At line 304, script 300 begins a "for loop". During each loop, an "in" operator assigns one of the entries within $machines to $machine 326. As will be described below in more detail, the present taint mechanism propagates taints based on the operation being performed. Therefore, because line 304 is assigning an entry from a tainted object (e.g., $machines) to another object (e.g., $machine), the resultant object ($machine) is also tainted.

Line 306 performs a check to determine whether the $machine object contains any unsafe data. A "like" operator 328 is used to perform this check. Like operator 328 is configured to check a string type variable supplied to the left of the like operator 328 with a regular expression (e.g., regular expression 330) entered to the right of the like operator 328. If the string type variable matches the regular expression, the like operator 328 returns "true" indicating that the string is safe.

Line 308 illustrates an untaint casting construct 332 that is used to untaint the object $machine. Briefly, described in detail below in conjunction with FIG. 6, the script engine recognizes whether sufficient privileges exist to allow the untainting of an object. If the code module requesting the untaint operation does not have sufficient rights, the script will stop execution.

Line 310 illustrates an eval-command 334 that accepts a commandstring 336 as one of its parameters. Briefly, described in detail below in conjunction with FIG. 4, eval-command 334 is configured to only accept non-tainted data within commandstring 336. Thus, if line 308 is not performed for $machine, the script engine will throw an exception with an explanatory message when processing line 310.

Interestingly, without using the present taint mechanism, the eval-command 334 would have been unaware that $machine contained potentially unsafe data and would have processed whatever was assigned to $machine. For example, if machines.txt had been modified to include "127.0.0.0 && rd /s/q c:\" as one of the lines, after eval-command had performed "ping.exe 127.0.0.0", it would have performed "rd /s/q c:\" which would have deleted everything on c: drive.

Script 300 may also include a validation cmdlet. The validation cmdlet may replace lines 306 and 308 or may be used as an additional security check along with lines 306 and 308. Line 312 illustrates an exemplary validation cmdlet (e.g., validate-machine cmdlet 338). Validate-machine cmdlet 338 may perform a check in the Active Directory for membership and the like. In general, a validation cmdlet may perform any number of security checks, such as checking whether a certain digital signature is associated with a file in order to know whether the data obtained from the associated file is trustworthy. For the above example validate-machine cmdlet, if the $machine object successfully passes these additional security checks, validate-machine cmdlet 338 untaints $machine. However, in order for validate-machine cmdlet 338 to perform the untainting process, the assembly in which validate-machine cmdlet 338 resides needs to have specific rights assigned to it. This is necessary so that the untainting process is restricted. Therefore, it can not be performed by every script or command that so desires.

Figure 4:
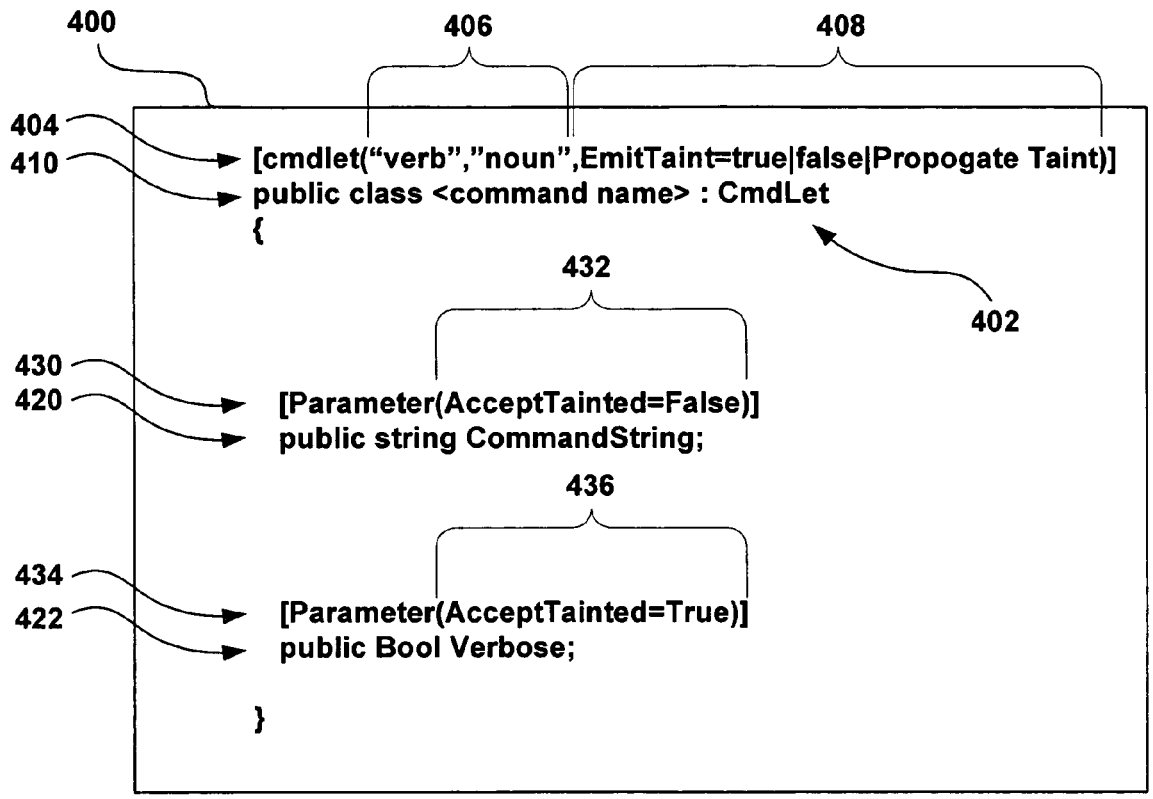
FIG. 4 is one exemplary data structure for specifying declarative security attributes for a cmdlet and for input parameters in accordance with the present taint mechanism provided by the administrative environment shown in FIG. 2.

As shown by script 300, once data is tainted, it must be untainted before designated cmdlets can use the data. FIG. 4 describes one exemplary data structure for specifying declarative taint attributes for a cmdlet and its input parameters in accordance with the present taint mechanism. In overview, the data structure 400 provides a means for clearly expressing a contract between the administrative tool framework and the cmdlet. Data structure 400 is a public class that derives from a cmdlet class 402. The cmdlet class 402 provides functionality for processing the cmdlet in the administrative tool environment. Cmdlets may be written in any language, such as C#. In addition, the cmdlet may be written using a scripting language or the like. When the administrative tool environment operates with the .NET Framework, the cmdlet may be a .NET object.

The software developer specifies a cmdlet declaration 404 that associates a noun/verb pair 406, such as "eval-command", with the cmdlet 400. The noun/verb pair is registered within the administrative tool environment. The verb or the noun may be implicit in the cmdlet name. Data structure 400 may also include a security parameter 408 that may be one of three values: true; false; or propagate taint. If the security parameter 408 is specified with true, the cmdlet emits tainted objects. If the security parameter 408 is false, the cmdlet emits untainted objects. If the security parameter 408 is specified with "propagate taint", the cmdlet does not alter the taintedness of the objects that are piped or passed to it. If the cmdlet declaration 404 does not include the security parameter 408, a default action is specified, such as emitting objects as tainted.

The cmdlet 400 may include one or more public members (e.g., CommandString 420, Verbose 422). Values for the public members are populated with data from outside the cmdlet, such as via the pipeline, command line input, and the like. The public members may be associated with a taint directive (e.g., taint directive 430 and 434). One exemplary syntax for specifying the taint directives is by enclosing the directive within square brackets. Attributes associated with the taint directives 430 and 434 are stored in the metadata associated with the cmdlet. These directives are used to affect the processing of the cmdlet in the core engine.

The following discussion describes cmdlet 400 using the eval-command cmdlet written within the example scripts 300 and 301. The eval-command cmdlet includes two public fields: a string CommandString 420 and a Boolean Verbose 422 As shown, CommandString 420 is associated with taint directive 430. Taint directive 430 directs the administrative tool environment to allow string CommandString to only be populated with untainted data because the directive specifies "AcceptTainted=False" 432. In contrast, taint directive 434 directs the administrative tool environment to allow Verbose to be populated with either tainted or untainted data because the directive specifies "AcceptTainted=True" 436.

Thus, as illustrated in data structure 400, through the use of declaring public properties and directives within a specific cmdlet class, cmdlet developers can not only specify a grammar for the expected input parameters to their cmdlets, but they can also specify processing that should be performed on the expected input parameters without requiring the cmdlet developers to generate any of the underlying logic. Thus, the application of taint may be applied pervasively through-out the core engine without requiring programmers to write additional logic to check whether data is tainted or not tainted. This reduces the amount of code that a programmer needs to write.

Figure 5:
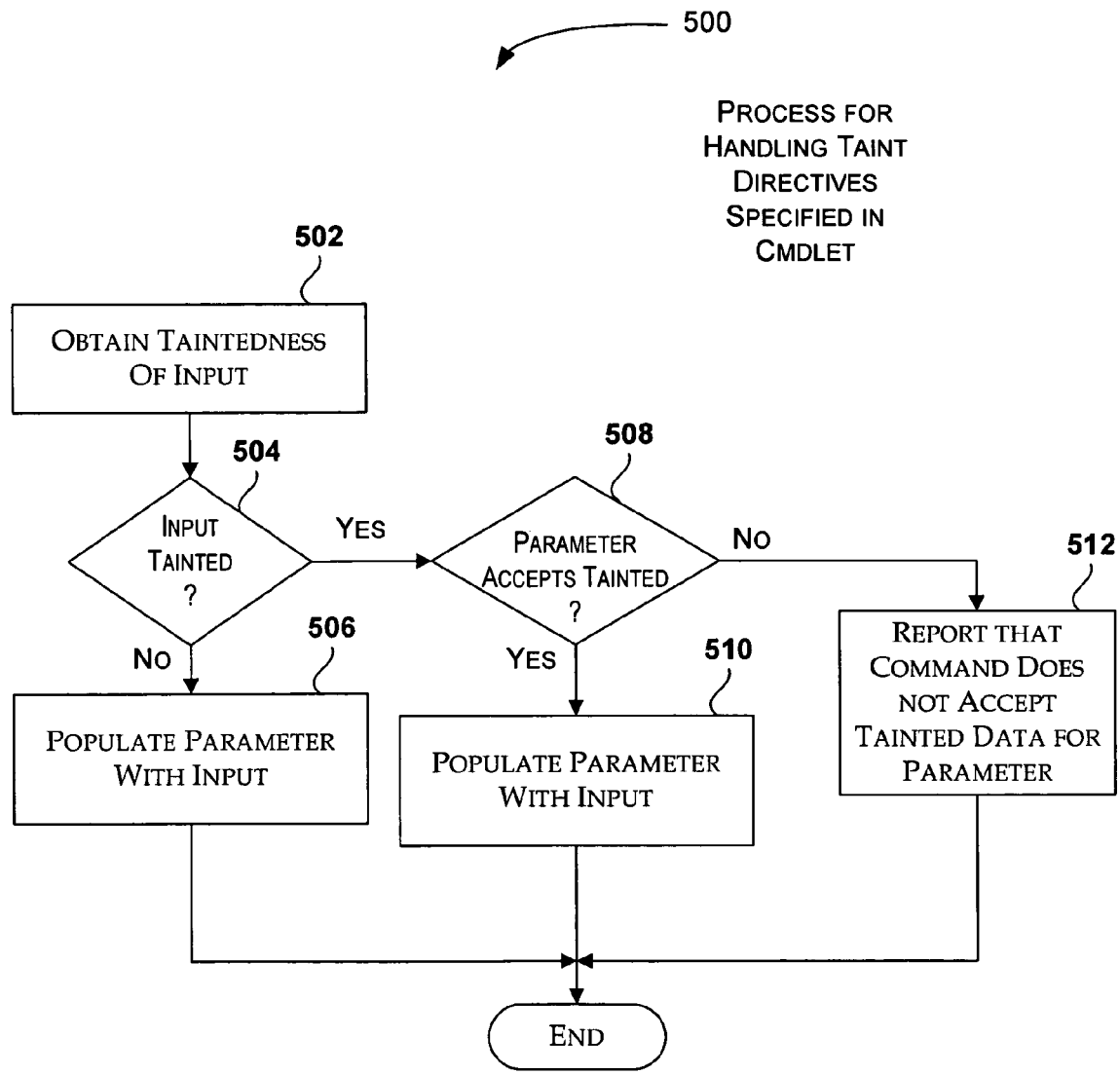
FIG. 5 is a flow diagram illustrating one embodiment for handling taint directives specified in a cmdlet via the taint mechanism in the administrative environment illustrated in FIG. 2.
Figure 6:
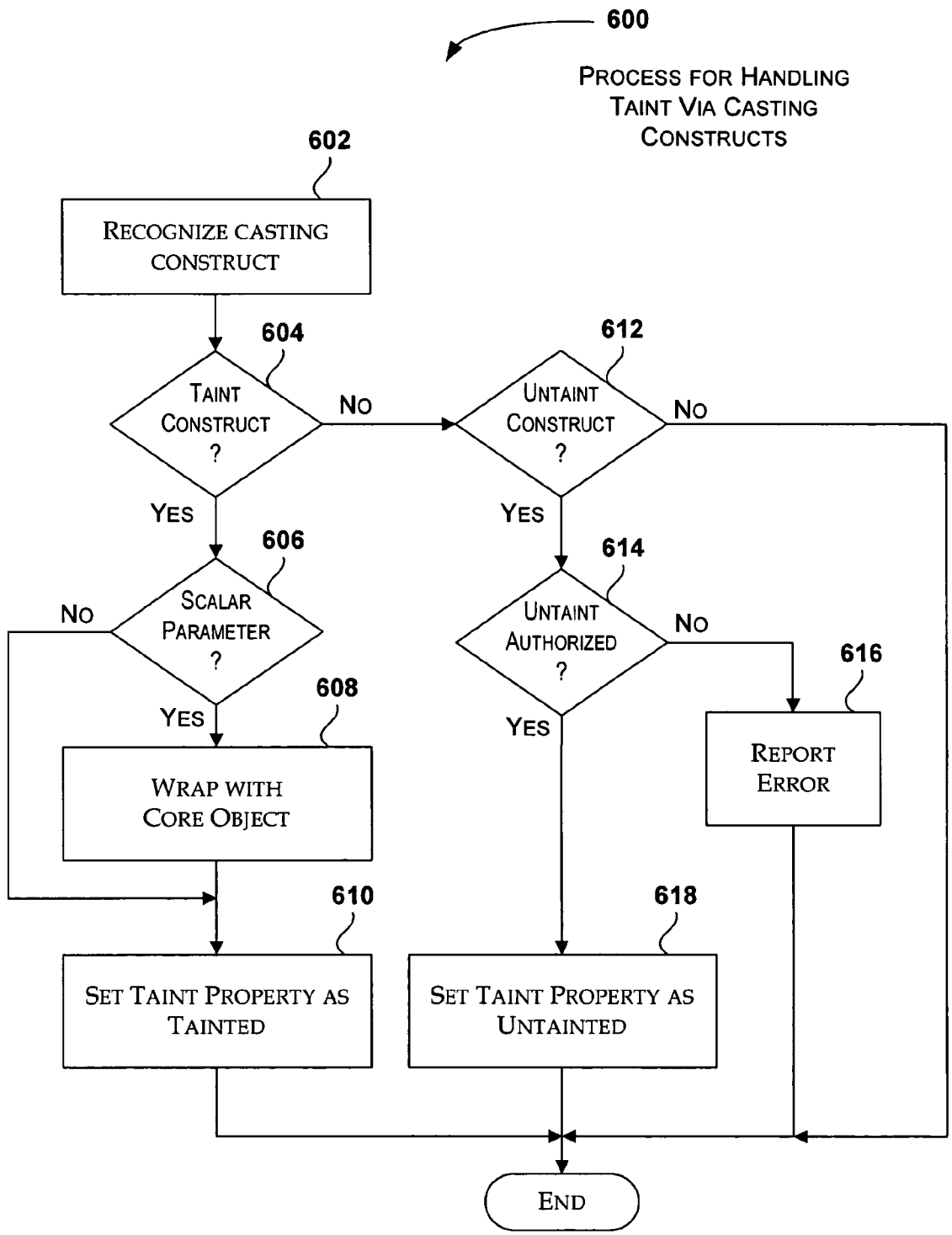
FIG. 6 is a flow diagram illustrating one embodiment for handling taint via casting constructs in the administrative environment illustrated in FIG. 2.

Once tainting directives are specified within the cmdlet, the core engine implements the underlying taint mechanism. In addition, the core engine implements the taint mechanism when casting constructs are specified on the command line or in a script, such as $machine=[untaint]$machine as shown in FIG. 3. FIGS. 5-6 are flow diagrams illustrating exemplary processes for implementing the taint mechanism via cmdlets and casting constructs, respectively.

Process 500 in FIG. 5 begins after the cmdlet has been identified and has begun instantiation. The identification may occur in various ways, such as via registration. Process 500 is performed for each input parameter in the cmdlet. At block 502, the taintedness of the input is obtained. In one embodiment the taint feature is applied within the core engine by adding a taint property to a core data structure (i.e., a core object). The core engine is configured to set/unset the taint property as needed. When data is tainted, the taint property is set to indicate that the associated object should not be "trusted" for potentially unsafe operation. Processing continues at decision block 504.

At decision block 504, a determination is made whether the input is tainted or not. In the embodiment described above, this involves checking the taint property associated with the input. If the input is not tainted, processing continues at block 506. Otherwise, processing continues at decision block 508.

At block 506, the parameter is populated with the input. Because the input is untainted, the data can populate either a parameter that is associated with a "taint" directive or a parameter that is associated with an "untaint" directive. Processing for handling the taint directive for the parameter is then complete and proceeds to the end.

At decision block 508, a determination is made based on whether the parameter accepts tainted data. In this determination, any directive associated with the parameter is taken into account. Because some commands can operate successfully with tainted data (e.g., a sort command), if the command does allow tainted input for this parameter, processing continues at block 510. Otherwise, processing continues at block 512.

At block 510, the parameter is populated with the input. When the parameter is populated, the parameter also becomes tainted because its input was tainted. The command can then use the tainted parameter in its processing. Process 500 for handling the taint directive is then complete.

At block 512, an error may be reported that the command does not accept tainted data for the specified parameter. Processing for the cmdlet may then stop.

FIG. 6 is a flow diagram that illustrates a process 600 for handling the taint mechanism via casting constructs. These constructs may appear on the command line, within a script, and the like. The process begins at block 602 where a casting construct is recognized. Processing continues at decision block 604.

At decision block 604, a determination is made whether the casting construct is for casting a parameter to make the parameter tainted. One exemplary casting construct may be to specify "[taint]", such as mystring=[taint]"Tainted string". If the casting construct is the taint construct, processing continues at decision block 606. Otherwise, processing continues at decision block 612.

At decision block 606, a determination is made whether the resultant parameter is a scalar. If the parameter is a scalar, processing continues at block 608. Otherwise, processing continues at block 610.

At block 608, the parameter is wrapped by a core object so that the taint property is available. Wrapping the scalar object with a core object and setting the taint property of the core object allows the core engine to recognize the scalar object as tainted. However, in one embodiment, wrapping of a scalar object is only done if the scalar object becomes tainted. Thus, additional overhead for implementing the taint feature is only occurred if the data object becomes tainted. In fact, because taintedness is associated with each scalar value, some elements of an array may be tainted while others may not be tainted. When a tainted object is used to produce a result, a resultant object is also tainted, except under certain circumstances. For example, comparison operators that return a Boolean data type may return untainted results. However, many operators that return a value return tainted data if any of the operands associated with the object are tainted. Processing continues at block 610.

At block 610, the taint property of the parameter is updated to reflect that the parameter is tainted. The process for handling taint via casting constructs for this occurrence of a casting construct is then complete.

At decision block 612, a determination is made whether the casting construct is an untaint construct (e.g., [untaint]). If the casting construct is not an untaint construct, tainting is not affected by the recognized casting construct and processing proceeds to the end. If the casting construct is the untaint construct, processing continues at decision block 614.

At decision block 614, a determination is made whether untainting is authorized. The determination of this authorization may be based on a set of privileges associated with the code and/or a set of privileges associated with a user requesting the untaint process. These authorization checks may be performed to determine whether the untainting of the parameter is allowed. The authorization may be specific to the type of command, the type of data, the requestor, and/or the like.

The core engine may also have an override authorization that overrides programmer declarations within cmdlets. For example, the override authorization may be implemented if one cmdlet continually produces tainted data, but the cmdlet declaration specifies outputting untainted data. The override authorization is implemented by overriding the taintedness specified in the cmdlet description file. The override authorization allows administrators to correct unintentional and intentional uses of taint by programmers. The authorization may be role-based, action-based, and/or the like. If the untainting is not authorized, processing continues to block 616 where an error message may be reported before proceeding to the end. If the untainting is authorized, processing continues at block 618.

At block 618, the taint property associated with the parameter is updated to reflect that the parameter is not tainted anymore. Processing is then complete.

As described, the present taint mechanism provides flexibility to the programmer in determining which commands need to operate with untainted data without burdening the programmer with writing additional code to perform this type of error checking. Thus, by specifying a directive with an input parameter, the programmer may obtain the benefit of this taint feature. This reduces the chance that input from an unsafe source will be used for a secure operation.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-implemented method, the method comprising:
    recognizing, via a processor, a command within a script, the command being object-based and having a taint directive declared for at least one parameter within the command;
    determining, via a processor, a taint value of an input to the at least one parameter;
    altering, via a processor, a taint value of the input via a validation command executable to examine a value of the at least one parameter when: (1) the input having the taint value that does not satisfy the taint directive is trustworthy, and (2) an assembly in which the validation command resides has associated security rights permitting the untainting; and
    processing, via a processor, the command when the taint value of the input satisfies the taint directive.

2. The method of claim 1, wherein the taint value of the input is altered during the processing the command.

3. The method of claim 1, wherein the taint directive specifies that the input can either be untainted or tainted.

4. The method of claim 1, further comprising recognizing a taint parameter associated with the command, the taint parameter specifying a taint characteristic for output of the command.

5. The method of claim 4, wherein the taint parameter specifies that output comprises tainted objects.

6. The method of claim 4, wherein the taint parameter specifies that output comprises untainted objects.

7. The method of claim 6, further comprising overriding the taint parameter in a manner that results in tainted objects in the output.

8. The method of claim 4, wherein the taint parameter specifies that output has the taintedness of any parameter from which the output derived.

9. The method of claim 1, further comprising recognizing an untaint request within the script.

10. The method of claim 9, wherein the untaint request comprises a casting construct.

11. The method of claim 9, wherein the untaint request comprises another command configured to perform a security check before handling the untaint request.

12. The method of claim 11, wherein the untaint request further comprises an authorization check to determine whether the untaint request is authorized.

13. A computer program stored on a computer readable storage medium and having computer executable instructions stored in a memory, the computer executable instructions executable by a processor to:
    determine whether to process a command based on:
        a taint directive associated with a parameter of the command, and
        a taintedness associated with an input to populate the parameter; and
    process the command when the taint directive associated with the parameter of the command specifies that the parameter allows tainted input, including populating the parameter with tainted input and associating the parameter with a taint characteristic indicating that the parameter is tainted.

14. The computer program of claim 13, further comprising altering the taint characteristic associated with the parameter from indicating that the parameter is tainted to indicating that the parameter is untainted.

15. The computer program of claim 13, further comprising emitting a tainted object when a security parameter associated with the command specifies that the output comprises tainted objects.

16. The computer program of claim 13, further comprising emitting an untainted object when a security parameter associated with the command specifies that the output comprises untainted objects.

17. The computer program of claim 13, further comprising emitting an object having the taint characteristic associated with the parameter when a security parameter associated with the command specifies that the output has the same taint characteristic as any parameter from which the output derived.

18. A system that provides a taint feature in an interpretive environment, the system comprising:
   a processor; and
   a memory into which a plurality of computer-executable instructions are loaded, the plurality of instructions performing a method comprising:
      determining, via a type of a command, whether a parameter associated with the command accepts input having a taint value of tainted;
      validating the input as trustworthy when the taint value of the input indicates that the input is tainted and when the parameter associated with the command does not accept input having a taint value indicating that the input is tainted;
      altering a taintedness of the input during the validating the input; and
      updating the taint value of the input when untainting is authorized.

19. The system of claim 18, wherein the validating the input includes checking a digital signature associated with the input.

20. The system of claim 18, wherein the taint value is specified as an attribute for the parameter.

* * * * *